US009659304B1

(12) United States Patent
Toewe

(10) Patent No.: US 9,659,304 B1
(45) Date of Patent: May 23, 2017

(54) METHODS, SYSTEMS, AND COMPUTER PROGRAM PRODUCTS FOR ASSOCIATING A SHOPPER LOYALTY PROGRAM WITH A MOBILE PAYMENTS ACCOUNT

(71) Applicant: CAROLINA COUPON CLEARING, INC., Winston-Salem, NC (US)

(72) Inventor: Jeffrey Toewe, Winston-Salem, NC (US)

(73) Assignee: CAROLINA COUPON CLEARING, INC., Winston-Salem, NC (US)

( * ) Notice: Subject to any disclaimer, the term of this patent is extended or adjusted under 35 U.S.C. 154(b) by 264 days.

(21) Appl. No.: 14/282,036

(22) Filed: May 20, 2014

(51) Int. Cl.
G06Q 20/20 (2012.01)
G06Q 30/02 (2012.01)
G06Q 40/02 (2012.01)

(52) U.S. Cl.
CPC ....... G06Q 30/0226 (2013.01); G06Q 40/025 (2013.01)

(58) Field of Classification Search
None
See application file for complete search history.

(56) References Cited

U.S. PATENT DOCUMENTS

| 2011/0225057 A1* | 9/2011 | Webb | G06Q 20/20 705/16 |
| 2011/0258117 A1* | 10/2011 | Ahmad | G06Q 20/202 705/44 |
| 2013/0041743 A1* | 2/2013 | Coppinger | G06Q 30/0239 705/14.36 |
| 2014/0289061 A1* | 9/2014 | Zenou | G06Q 20/3227 705/21 |

OTHER PUBLICATIONS

Jeffrey Toewe, U.S. Appl. No. 14/282,016, filed May 20, 2014.

* cited by examiner

*Primary Examiner* — Eric Netzloff
(74) *Attorney, Agent, or Firm* — Allen, Dyer, Doppelt, Milbrath & Gilchrist, P.A.

(57) ABSTRACT

A method includes performing operations as follows on at least one processor: receiving credentials from a shopper, the credentials being associated with a purchase from a merchant, determining that the shopper is registered for a loyalty program with the merchant based on the credentials, determining that the shopper has a mobile payments account with a mobile payments processor associated with the loyalty program, the mobile payments account having a mobile phone number associated therewith, sending a payment request for the purchase to the mobile payments processor with the mobile phone number, and receiving an approval for advancing funds for the purchase from the mobile payments processor responsive to the shopper sending a payment request from a mobile device having the mobile phone number.

20 Claims, 10 Drawing Sheets

METHODS, SYSTEMS, AND COMPUTER PROGRAM PRODUCTS FOR ASSOCIATING A SHOPPER LOYALTY PROGRAM WITH A MOBILE PAYMENTS ACCOUNT

BACKGROUND

The present disclosure relates to retailing methods, systems, and computer program products involving the sale of goods and/or services to a shopper and, more particularly, to methods, systems, and computer program products for processing payment when goods and/or services are purchased by a shopper.

Retailers with brick and mortar stores typically have checkout lanes or checkout locations where shoppers present their items or identify one or more services that they wish to purchase. Shoppers typically pay for their purchases using cash, gift card, debit card, credit card, or charge card, which may be issued through the retailer, bank, or other type of financial institution. With the proliferation of intelligent mobile devices, shoppers may use a digital wallet to pay for purchases both on-line and in a retail store environment. A digital wallet refers to an electronic device that can communicate payment information to the merchant. The payment information may include identification information for checking accounts, debit card accounts, credit card accounts, pre-paid gift cards, and the like. In addition to including payment information, a digital wallet may also include information that can be used to authenticate a user's identity. For example, a digital wallet may include such information as a shopper's driver's license, insurance information, store loyalty card(s), store/bank reward(s) accounts, and the like. A shopper's identification credentials along with a desired payment account can be transferred to a merchant using a bar code scanner, Near Field Communication (NFC), Short Message Service (SMS), Bluetooth, Wi-Fi, or other suitable technology. A digital wallet may include security software to encrypt the financial information and personal identity information used during a transaction. Application developers have developed digital wallet applications that run on various types of smartphone platforms; such as the iOS and Android platforms.

SUMMARY

In some embodiments of the inventive subject matter, a method comprises receiving credentials from a shopper, the credentials being associated with a purchase from a merchant, determining that the shopper is registered for a loyalty program with the merchant based on the credentials, determining that the shopper has a mobile payments account with a mobile payments processor associated with the loyalty program, the mobile payments account having a mobile phone number associated therewith, sending a payment request for the purchase to the mobile payments processor with the mobile phone number, and receiving an approval for advancing funds for the purchase from the mobile payments processor responsive to the shopper sending a payment request from a mobile device having the mobile phone number.

In other embodiments, the method further comprises sending a transaction identification for the purchase to the mobile payments processor.

In still other embodiments, the credentials comprise a mobile phone number.

In still other embodiments, the method further comprises determining whether the shopper is entitled to a reduction in price for the purchase based on the loyalty program, and applying the reduction in price for the purchase when the shopper is determined to be entitled to the reduction.

In still other embodiments, the method further comprises notifying the merchant that payment has been approved.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims Moreover, it is intended that all embodiments disclosed herein can be implemented separately or combined in any way and/or combination.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

Figure 1:
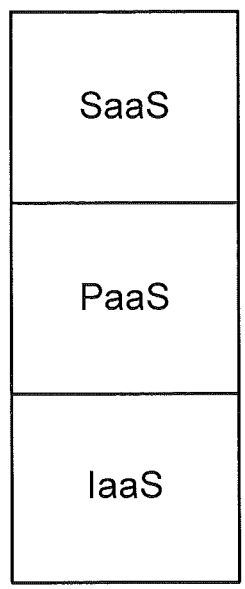
FIG. 1 is a block diagram that illustrates a cloud computing paradigm.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Further-more, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Embodiments of the inventive subject matter are described herein with respect to computing resources being provided by a computing resource provider. As used herein, a computing resource may include, but is not limited to, a virtual machine, a computer processor, a data storage element, such as a memory, a database, a communication medium, a switch, a router, a data center, a host processor/system, a cluster, an application, a hypervisor, a host operating system, a guest operating system, and the like. It will be further understood that a computing resource may include portions of the aforementioned elements, for example. In this regard, a computing resource may comprise a time slice of a virtual machine or processor, a particular bandwidth of a communication medium, a portion of a memory, and/or a portion of a database.

As used herein, the term "mobile device" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. A mobile device may also include a frequency modulated (FM), amplitude modulated (AM), and/or satellite radio receiver for receiving radio transmissions. Mobile devices may also be referred to as "pervasive computing" devices.

Some embodiments are described herein in the context of providing computing or data processing services via the cloud. Cloud computing is a computing paradigm where shared resources, such as processor(s), software, and information, are provided to computers and other devices on demand typically over a network, such as the Internet. In a cloud computing environment, details of the computing infrastructure, e.g., processing power, data storage, bandwidth, and/or other resources are abstracted from the user. The user does not need to have any expertise in or control over such computing infrastructure resources. Cloud computing typically involves the provision of dynamically scalable and/or virtualized resources over the Internet. A user may access and use such resources through the use of a Web browser. A typical cloud computing provider may provide an online application that can be accessed over the Internet using a browser. The cloud computing provider, however, maintains the software for the application and some or all of the data associated with the application on servers in the cloud, i.e., servers that are maintained by the cloud computing provider rather than the users of the application.

As used herein, the terms "promotion" and "offer" mean any type of instrument used to add value or an incentive to consumers, wholesalers, retailers, or other type of customer or shopper to stimulate the sale of a product or service. A promotion or offer may include, but is not limited to, one or more of a coupon, a rebate, a discount, a reward, a price reduction, points (e.g., credits, miles, etc.) in a rewards or loyalty program, a buy x get y free program, and a sample.

As used herein, "data" means raw, unorganized facts that need to be processed. Data can be something simple and seemingly random and useless until it is organized. When data is processed, organized, structured, or presented in a given context so as to make it useful it is called "information."

FIG. 1 illustrates a conventional cloud service model that includes Infrastructure as a Service (IaaS), Platform as a Service (PaaS), and Software as a Service (SaaS). Infrastructure as a Service, delivers computer infrastructure—typically a platform virtualization environment—as a service. Rather than purchasing servers, software, data-center space or network equipment, clients instead buy those resources as a fully outsourced service. Suppliers typically bill such services on a utility computing basis and the amount of resources consumed. Platform as a Service delivers a computing platform as a service. It provides an environment for the deployment of applications without the need for a client to buy and manage the underlying hardware and software layers. Software as a Service delivers software services over the Internet, which reduces or eliminates the need for the client to install and run an application on its own computers, which may simplify maintenance and support.

Virtualized computing environments may be used to provide computing resources to end users. In a cloud computing environment, the physical hardware configuration is hidden from the end user. Cloud computing systems may include servers, network storage devices, routers, gateways, communication links, and other devices. Because the physical hardware and software platforms on which cloud computing system is implemented are hidden within a "cloud," they can be managed, upgraded, replaced or otherwise changed by a system administrator without the customer being aware of or affected by the change.

In a typical cloud computing environment, applications may be executed on virtual machines, which are isolated guest operating systems installed within a host system. Virtual machines are typically implemented with either software emulation or hardware virtualization, or both. A single hardware and/or software platform may host a number of virtual machines, each of which may have access to some portion of the platform's resources, such as processing resources, storage resources, etc.

Figure 2:
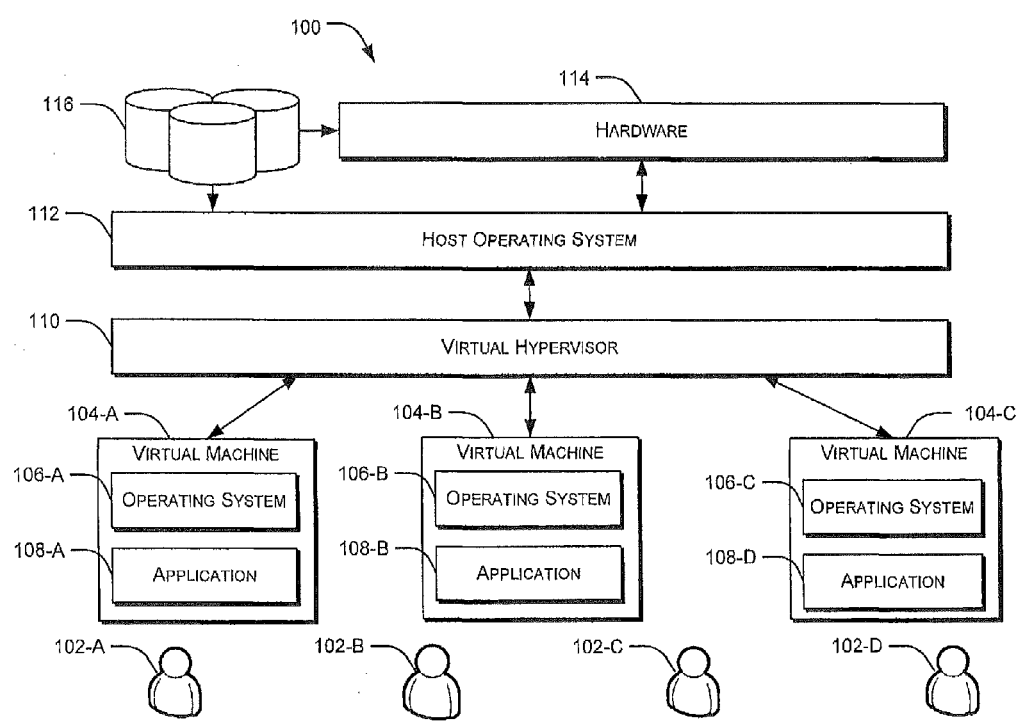
FIG. 2 is a block diagram that illustrates a virtualized computing environment.

FIG. 2 illustrates a server system 100 for a virtualized computing environment in which the inventive subject matter of the present disclosure can function. The server system 100 generally hosts one or more virtual machines 104 (hereafter virtual machine 104), each of which runs a guest operating system 106 and application 108. The computing needs of users 102 drive the functionality of the virtual machines 104. A hypervisor 110 provides an interface between the virtual machines 104 and a host operating system 112 and allows multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computing system capable of implementing virtual machines 104, which may include, without limitation, a mainframe, personal computer (PC), micro-computer, handheld computer, mobile computing platform, server, or any other appropriate computer hardware. The hardware platform 114 may include computing resources, such as a central processing unit (CPU); networking controllers; communication controllers; a display unit; a program and data storage device; memory controllers; input devices (e.g., a keyboard, a mouse, etc.) and output devices, such as printers. The CPU may be any processor capable of supporting virtualization.

The hardware platform 114 may be further connected to the data storage space 116 through serial or parallel connections. The data storage space 116 may be any suitable device capable of storing computer-readable data and instructions, and it may include logic in the form of software applications, random access memory (RAM), or read only memory (ROM), removable media, or any other suitable memory component. According to the illustrated embodiment, the host operating system 112 stands between the hardware platform 114 and the users 102 and is responsible for the management and coordination of activities and the sharing of the computing resources. Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the server 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs. The hypervisor 110 creates an environment for implementing a virtual machine, hosting the "guest" virtual machine. One host operating system 112 is capable of implementing multiple isolated virtual machines simultaneously.

A hypervisor 110 (which may also be known as a machine monitor or VMM) runs on the host operating system 112 and provides an interface between the virtual machines 104 and the hardware platform 114 through the host operating system 112. The hypervisor 110 virtualizes the computing system resources and facilitates the operation of the virtual machines 104. The hypervisor 110 may provide the illusion of operating at the highest priority level to the guest operating systems 106. The hypervisor 110 maps the guest operating system's priority level to a priority level lower than the top most priority level. As a result, the hypervisor 110 can intercept the guest operating system 106 to execute instructions that require virtualization assistance. Alternatively, the hypervisor 110 may emulate or actually execute the instructions on behalf of the guest operating system 106. Software operations permitting indirect interaction between the guest operating system 106 and the physical hardware platform 114 are also performed by the hypervisor 110.

Virtual machines 104 present a virtualized environment to guest operating systems 106, which in turn provide an operating environment for applications 108 and other software constructs.

The foregoing description with respect to FIG. 2 of a virtualized computing environment uses a Type 2 or hosted hypervisor 110, which runs within a conventional operating system environment. In this configuration, the hypervisor layer is disposed between the host operating system and one or more guest operating systems. It will be understood that the hypervisor can also be implemented as a Type 1 hypervisor, which may be called a native or bare metal hypervisor. A Type 1 hypervisor runs directly on the host's hardware to control the hardware and manage guest operating systems. Thus, a Type 1 hypervisor layer is disposed between the hardware and one or more guest operating systems. In accordance with various embodiments of the present inventive concept, a Type 1 or a Type 2 hypervisor can be used to implement a virtualized computing environment.

Figure 3:
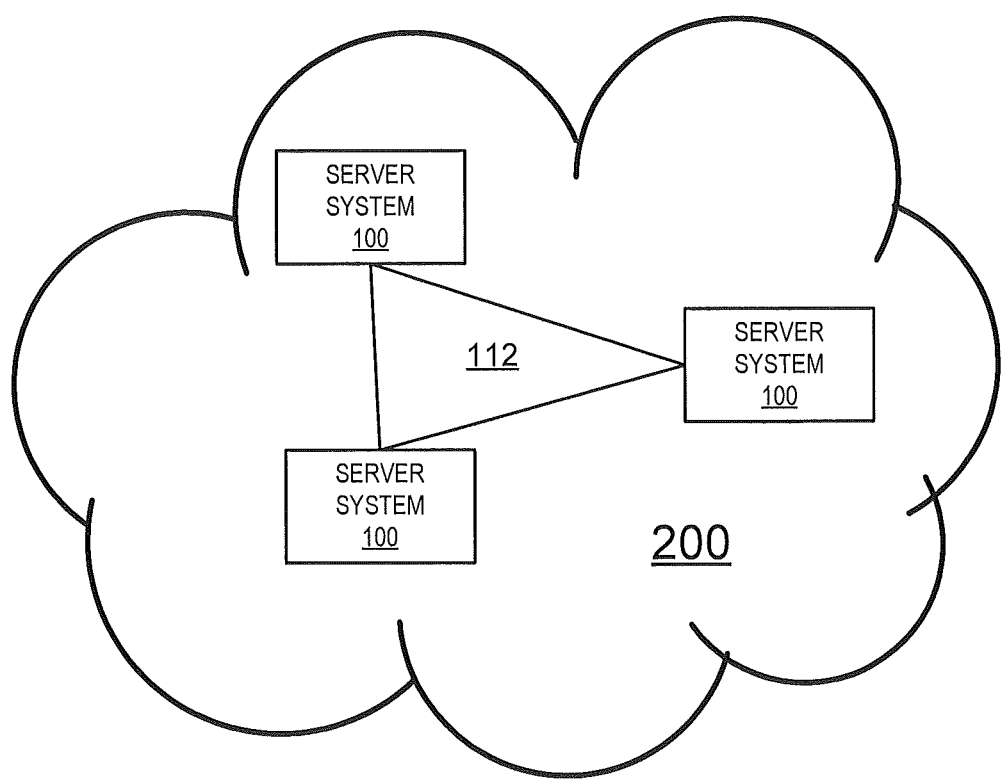
FIG. 3 is a block diagram that illustrates a cloud computing environment.

Referring to FIG. 3, a virtualized computing environment 200 (referred to generally as cloud 200) may include one or more server systems 100 that may include one or more electronic computing devices operable to receive, transmit, process, and store data. For example, the servers in the cloud 200 may include one or more general-purpose PCs, Macintoshes, micro-computers, workstations, Unix-based computers, server computers, one or more server pools, or any other suitable devices. In certain embodiments, the cloud 200 may include a web server. In short, the cloud 200 may include any suitable combination of software, firmware, and hardware.

The cloud 200 may include a plurality of server systems 100 that are communicatively coupled via a network 112. The network 112 facilitates wireless or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANS), wide area networks (WANs), all or a portion of the global computer network known as the Internet, and/or any other communication system or systems at one or more locations. Although referred to herein as "server systems," it will be appreciated that any suitable computing device may be used.

Virtual machines and/or other objects in a virtualization environment can be grouped into logical clusters for management and/or operational purposes. For example, virtual machines can be grouped into clusters based on load balancing needs, security needs, redundancy needs, or any other needs as determined by a system administrator. The virtual machines grouped within a cluster may or may not all be implemented on a single physical server. Any desired number of clusters can be defined subject to system limitations, and each of the clusters can include any desired number of virtual machines subject to server limitations.

Virtual machines can be deployed in particular virtualization environments and organized to increase the efficiency of operating and/or managing a virtual computing environment. For example, virtual machines may be grouped into clusters to provide load balancing across multiple servers.

Virtual machines within a same cluster can be managed by a single virtualization environment manager to have the same or similar resource access privileges (e.g., processor utilization, priority, memory allocation, communication interface access privileges, etc.), while virtual machines within different clusters can have different resource access privileges.

Virtual machines that are deployed within a single cluster may share physical resources within a server. For example, virtual machines that are deployed within a single cluster may share physical memory, storage, communication facilities and other resources or services of a server. Whenever computing resources are shared, there is the possibility that one virtual machine could intentionally or unintentionally gain access to data of another virtual machine.

Some embodiments are described herein with respect to a shopper initiating a purchase using, for example, a mobile device to communicate with a mobile payments processor, such as Payfone™ to authorize payment for a purchase. The shopper may provide credentials at a point of sale system at a merchant's checkout station, for example, which may be provided to a payment system located in the cloud. The credentials may include, for example, a mobile phone number, which the payment system may use in sending a payment request for a purchase to the mobile payments processor. The mobile phone number may allow the mobile payments processor to match the payment request from the payments system with the payment authorization request from the shopper and approve the purchase transaction. The payments system may notify the merchant of the payment approval received from the mobile payments processor. Thus, a shopper need only provide a mobile phone number to the merchant at the point of sale to complete a purchase transaction. The mobile payments processor may act as a proxy for payment to the merchant with the particulars of the method used to secure payment, e.g., credit card, debit card, checking account, periodic wireless service bill, etc. being a matter agreed upon between the shopper and the mobile payments processor.

Figure 4:
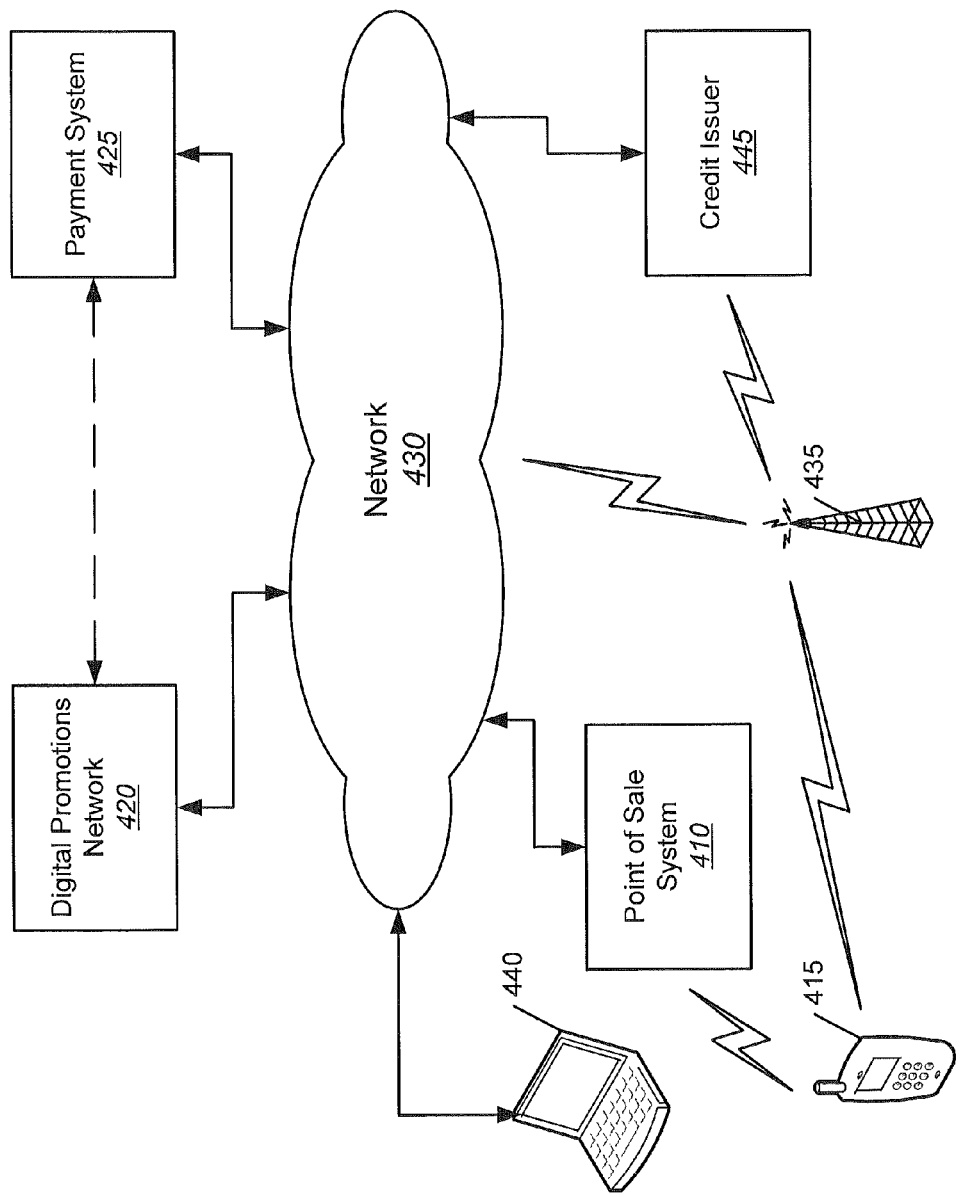
FIG. 4 is a block diagram that illustrates a system for managing payments in financial transactions according to some embodiments of the inventive subject matter.

FIG. 4 is a block diagram that illustrates a system for managing payments in financial transactions according to some embodiments of the inventive subject matter. The system comprises a Point Of Sale (POS) system 410 that may be operated, for example, in the store of a retailer or merchant. The POS system 410 may include a cash register that is managed by an attendant or may be a self-checkout register. The POS system 410 may be configured to scan products and read product codes. For example, the POS system 410 can be configured to read a UPC product bar code and/or a QR code. In some embodiments, the POS system 410 can be configured to scan and read other identifiers (i.e., codes) representative of a product. Once the products are scanned and read, the POS system 410 can be configured to generate transaction data and to receive payment associated with the products and/or services listed in the transaction data. The POS system 410 may receive payment from a shopper in a variety of ways including, but not limited to, cash, credit card, debit card, gift card, loyalty card, and reward card.

A shopper may provide payment information to the POS system 410 using a mobile device 415 that may include links to financial accounts thereon and/or data identifying various financial accounts, such as credit card accounts, store credit accounts, debit card accounts, checking accounts, loyalty program accounts, rewards accounts, and the like. The mobile device 415 may also include identification credentials, such as a photo identification, driver's license, passport, insurance card, home and/or work address information, home and/or work telephone numbers, and the like. In some embodiments, the financial information and/or personal identification information may be managed using a digital wallet application residing on the phone or in a cloud server on the Internet or other network.

The POS system 410 may coupled to a Digital Promotions Network (DPN) 420 and a payment system 425 via a network 430. The network 430 may be a global network, such as the Internet or other publicly accessible network. Various elements of the network 430 may be interconnected by a wide area network, a local area network, an Intranet, and/or other private network, which may not be accessible by the general public. Thus, the communication network 430 may represent a combination of public and private networks or a virtual private network (VPN). The network 430 may be a wireless network, a wireline network, or may be a combination of both wireless and wireline networks.

The digital promotions network 420 may be configured to manage loyalty programs for retailers, manufacturers, and/or service providers. In some embodiments, the DPN 420 may allow for shoppers to establish accounts on the DPN 420 via which shoppers can acquire promotions or offers. Retailers, manufacturers, merchants, wholesalers and other merchandisers can make promotions or offers available to shoppers in a variety of ways. For example, a shopper may acquire a coupon via a circular in the paper or a mailer and may scan the coupon using the mobile device 415 to add the coupon to the shopper's account on the DPN 420 via communication over a wireless network 435 and the network 430. In other embodiments, promotions may be emailed to the user where they may be accepted and added to the shopper's account on the DPN 420. Promotions may also be delivered to the shopper through SMS message where they can be accepted and added to the user's account on the DPN 420. In still other embodiments, a shopper may use a browser on the mobile device 415 or computer 440 to review available offers and select certain offers to be added to the shopper's account on the DPN 420. It will be understood that these examples are for purposes of illustration. A shopper may acquire promotions or offers in multiple ways in accordance with various embodiments of the inventive subject matter, which are not limited to the foregoing examples. The DPN 420 may also manage the expiration of promotions or offers to prevent a shopper from redeeming a promotion or offer that is no longer valid. A shopper may synchronize promotions or offers stored on the DPN 420 with digital wallet applications, for example, running on the shopper's digital devices, such as the mobile device 415 and the computer 440.

In some embodiments, the DPN 420 may also be used to manage loyalty programs for retailers or merchandisers or service providers. As a result, when a shopper checks out at the POS system 410, the POS system 410 may communicate with the DPN 420 to determine if the shopper has any promotions or offers that may be redeemed based on the content of the item(s) and/or service(s) being purchased. The POS system 410 may also update the shopper's loyalty account on the DPN 420 with any rewards points, credits, incentives, or other types of offers or promotions that the retailer or manufacturer wishes to grant to the shopper. In some embodiments, the offers or promotions presented to a shopper, whether at the time of check out or any other time, may be based on the shopper's past purchase history and analytics that indicate that the shopper may be receptive to offers or promotions of a certain type and/or for a certain product or service. The DPN 420 may have such purchasing history available based on the shopper's purchases outlets both online and at brick and mortar stores. The DPN 420 may also track and maintain a history of shopper behavior with respect to returns, use of credit, redemption of offers and promotions, use of social media to praise and/or criticize products and services, and other consumer attributes.

The POS system 410 may also communicate with the payment system 425 via the network 430, which facilitates the processing of payment information for the goods and/or services purchased by the shopper. The payment system 425 may communicate with both a credit issuer 445, which may approve a shopper's purchase, and the DPN 420 to allow for reduced transaction risks for a credit issuer 445 and/or retailer and to provide shoppers with an improved purchasing experience with reduced risks of fraud and/or identity theft. The payment system 425 and the DPN 420 may communicate via the network 430 and/or may communicate directly as part of a common cloud data processing system that provides both DPN and payment services. The credit issuer 445 may represent any institution providing a source of funds for a shopper's financial transaction including, but not limited to, banks, credit unions, retailers (e.g., store credit accounts/charge cards), mobile payment processors, such as Payfone™, and other financial institutions. It will be understood that the credit issuer 445 may provide funds both through credit accounts and non-credit accounts, including a shopper's savings and/or checking account.

Although FIG. 4 illustrates an exemplary communication network and an exemplary hardware/software architecture that may be used to facilitate the payment for goods and/or services purchased by a shopper, it will be understood that embodiments of the present invention are not limited to such a configuration but are intended to encompass any configuration capable of carrying out operations as described herein.

Computer program code for carrying out operations of data processing systems and servers described above with respect to FIG. 4, such as the DPN 420 and the payment system 425, may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

Figure 5:
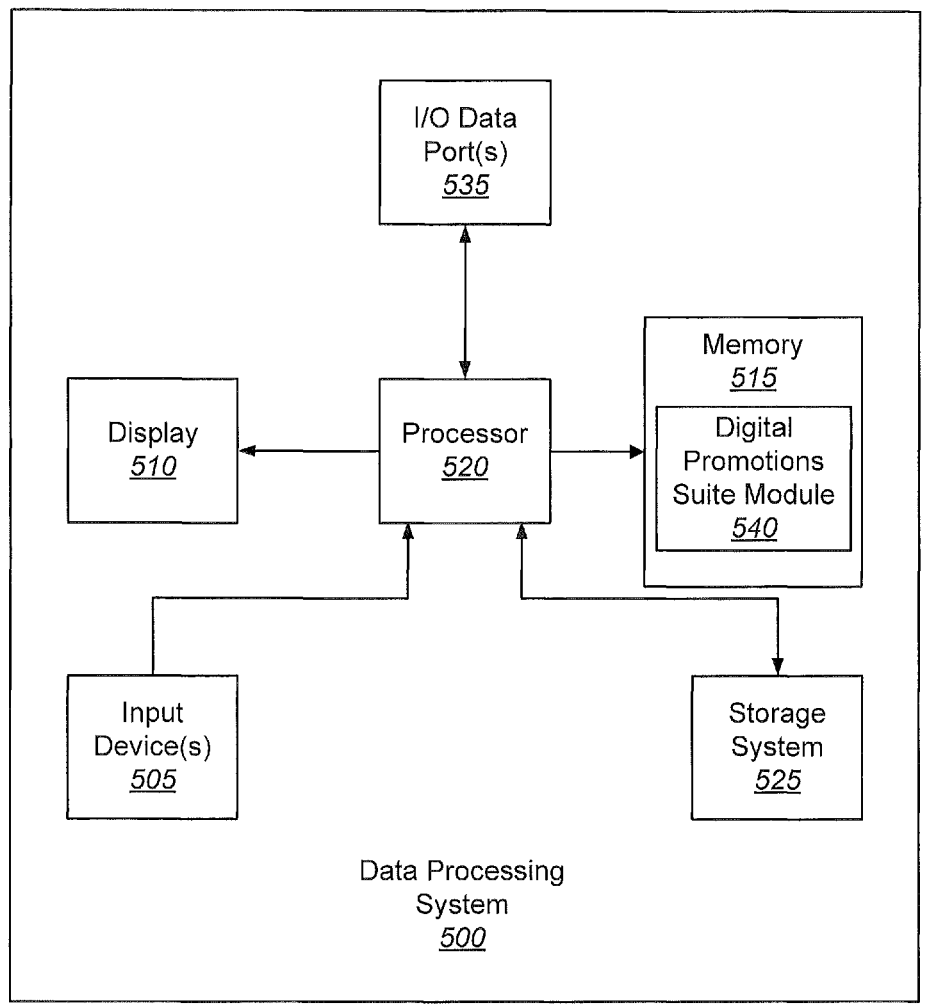
FIG. 5 is a block diagram that illustrates a data processing system that may be used in embodiments of the digital promotions network of FIG. 4 in accordance with some embodiments of the inventive subject matter.

FIG. 5 illustrates a data processing system 500 that may be used in embodiments of the DPN 420 in accordance with some embodiments of the inventive subject matter. The data processing system 500 comprises input device(s) 505, such as a keyboard or keypad, a display 510, and a memory 515 that communicate with a processor 520. The data processing system 500 may further comprise a storage system 525, and an I/O data port(s) 535 that also communicate with the processor 520. The storage system 525 may include removable and/or fixed media, such as floppy disks, ZIP drives, hard disks, or the like as well as virtual storage such as a RAMDISK. The I/O data port(s) 535 may be used to transfer information between the data processing system 500 and another computer system or a network (e.g., the Internet). These components may be conventional components, such as those used in many conventional computing devices, and their functionality, with respect to conventional operations, is generally known to those skilled in the art. The memory 515 may be configured with a digital promotions suite module 540 that may be used to provide DPN services, such as managing loyalty programs for retailers, manufacturers, and/or service providers, generating offers/promotions, handling the redemption of offers/promotions, and/or tracking/analyzing the behavior of shoppers.

Figure 6:
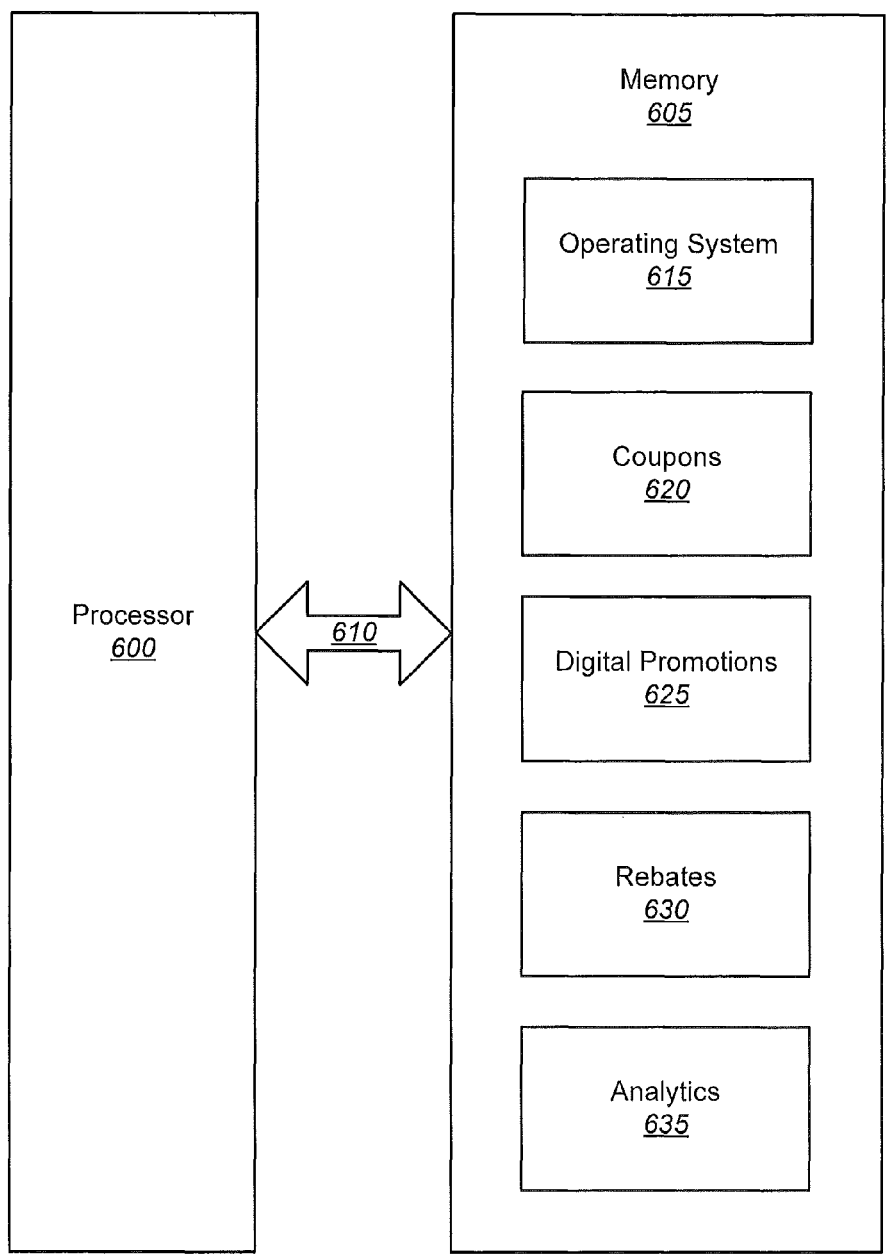
FIG. 6 is a block diagram that illustrates a software/hardware architecture for a digital promotions network server in accordance with some embodiments of the inventive subject matter.

FIG. 6 illustrates a processor 600 and memory 605 that may be used in embodiments of data processing systems, such as the data processing system 500 of FIG. 5, for providing DPN services in accordance with some embodiments of the inventive subject matter. The processor 600 communicates with the memory 605 via an address/data bus 610. The processor 600 may be, for example, a commercially available or custom microprocessor. The memory 605 is representative of the one or more memory devices containing the software and data used to provision software in accordance with some embodiments of the present invention. The memory 605 may include, but is not limited to, the following types of devices: cache, ROM, PROM, EPROM, EEPROM, flash, SRAM, and DRAM.

As shown in FIG. 6, the memory 605 may contain up to five or more categories of software and/or data: an operating system 615, a coupons module 620, a digital promotions module 625, a rebates module 630, and an analytics module 635. The operating system 615 generally controls the operation of the data processing system. In particular, the operating system 615 may manage the data processing system's software and/or hardware resources and may coordinate execution of programs by the processor 600.

The coupons module 620 may be configured to process coupon redemptions and facilitate the settlement with the issuing party, such as a retailer, service provider, or manufacturer. The coupons module 620 may include safeguards to facilitate the detection of fraud and suspicious submissions. In cooperation with the analytics module 635, the coupons module 620 may be used to evaluate the efficacy of coupons in promoting purchases and design new coupon based marketing campaigns based on such performance evaluations.

The digital promotions module 625 may be configured to manage marketing campaigns involving promotions and/or offers for parties, such as retailers, service providers, and manufacturers including the settlement with the issuers of such promotions and/or offers when the promotions or offers are redeemed. The digital promotions module 625 supports multiple types of offers or promotions and can allow shoppers to maintain accounts through which promotions or offers can be acquired and redeemed. The digital promotions module 625 can communicate with POS systems to allow any applicable promotions or offers to be identified to provide the shopper with the opportunity to redeem the promotions or offers at checkout. The digital promotions module 625 may cooperate with the analytics module 635 to evaluate the efficacy of the promotions or offers in promoting purchases and designing new marketing campaigns based on promotions or offers in view of the performance of previous campaigns.

The rebates module 630 may be configured to manage the issuance and redemption of rebates for both retailers and manufacturers including traditional mail-in rebates and digital or electronic rebates. The rebates module 630 may be configured with safeguards to detect fraud or improper submission of rebates, particularly in regulated industries, such as alcohol, tobacco, and pharmaceuticals. The rebates module 630 may cooperate with the analytics module 635 to evaluate the efficacy of the rebates in promoting purchases and designing new marketing campaigns based on rebates in view of the performance of previous campaigns.

The analytics module 635 may be configured to acquire data based on shopper behavior, including, but not limited to, purchases, returns, offer/promotion acquisition and redemption, social media, and public records, along with data provided by manufacturers, service providers, retailers, and/or financial institutions on product/service marketing, sales, loyalty programs, customer feedback, customer surveys, financing information, and the like, which can then be processed by an analytics engine to better target offers and/or promotions to shoppers and potential shoppers/customers, develop product/service marketing campaigns, and/or influence the design of particular products and/or services to better appeal to customers.

Although FIG. 6 illustrates exemplary hardware/software architectures that may be used in data processing systems, such as the data processing system 500 of FIG. 5, for providing DPN services, it will be understood that the present invention is not limited to such a configuration but is intended to encompass any configuration capable of carrying out operations described herein. Moreover, the functionality of the data processing system 500 of FIG. 5 and the hardware/software architecture of FIG. 6 may be implemented as a single processor system, a multi-processor system, a multi-core processor system, a network of stand-alone computer systems, or one or more virtual machines in accordance with various embodiments.

Computer program code for carrying out operations of data processing systems discussed above with respect to FIG. 6 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

Figure 7:
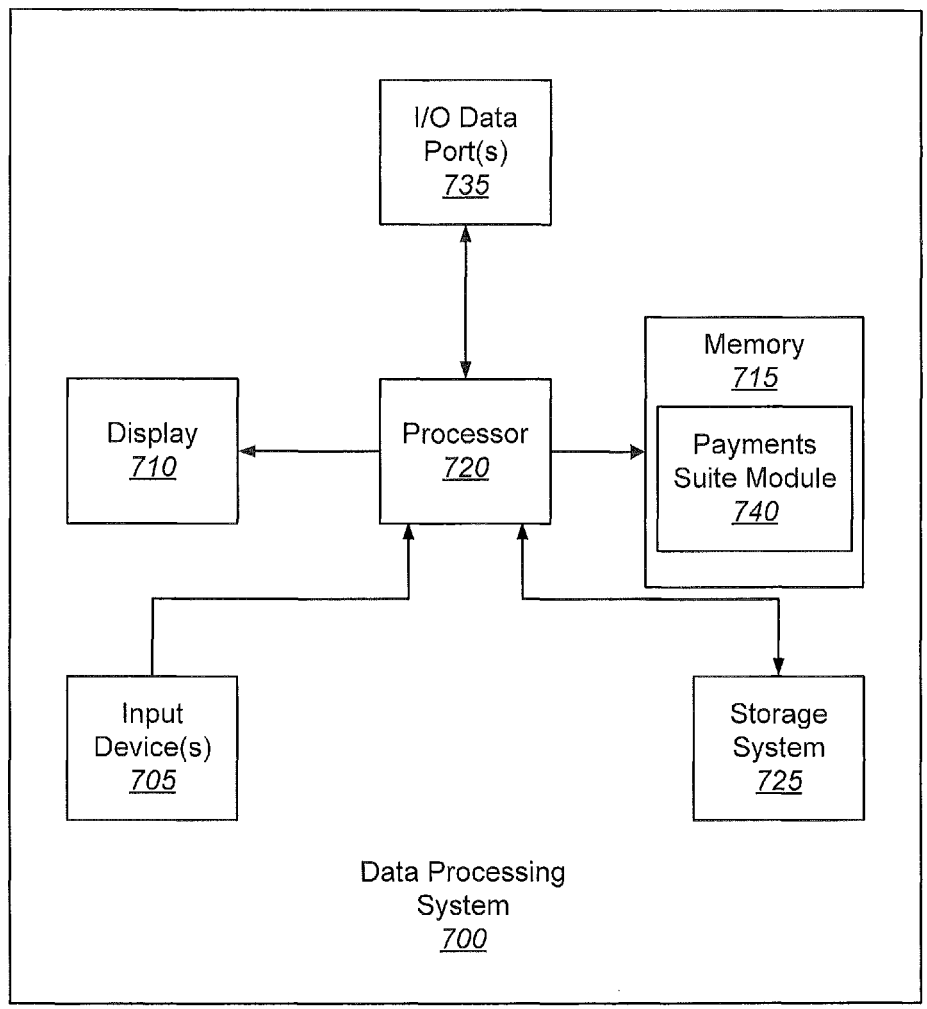
FIG. 7 is a block diagram that illustrates a data processing system that may be used in embodiments of the payments system of FIG. 4 in accordance with some embodiments of the inventive subject matter.

FIG. 7 illustrates a data processing system 700 that may be used in embodiments of the payment system 425 in accordance with some embodiments of the inventive subject matter. The data processing system 700 comprises input device(s) 705, such as a keyboard or keypad, a display 710, and a memory 715 that communicate with a processor 720. The data processing system 700 may further comprise a storage system 725, and an I/O data port(s) 735 that also communicate with the processor 720. The storage system 725 may include removable and/or fixed media, such as floppy disks, ZIP drives, hard disks, or the like as well as virtual storage such as a RAMDISK. The I/O data port(s) 735 may be used to transfer information between the data processing system 700 and another computer system or a network (e.g., the Internet). These components may be conventional components, such as those used in many conventional computing devices, and their functionality, with respect to conventional operations, is generally known to those skilled in the art. The memory 715 may be configured with a payments suite module 740 that may be used to provide payment services, such as shopper authentication, risk management based on, for example, shopper history and detection of evaluation of shopper location, and facilitation of various payment methods.

Figure 8:
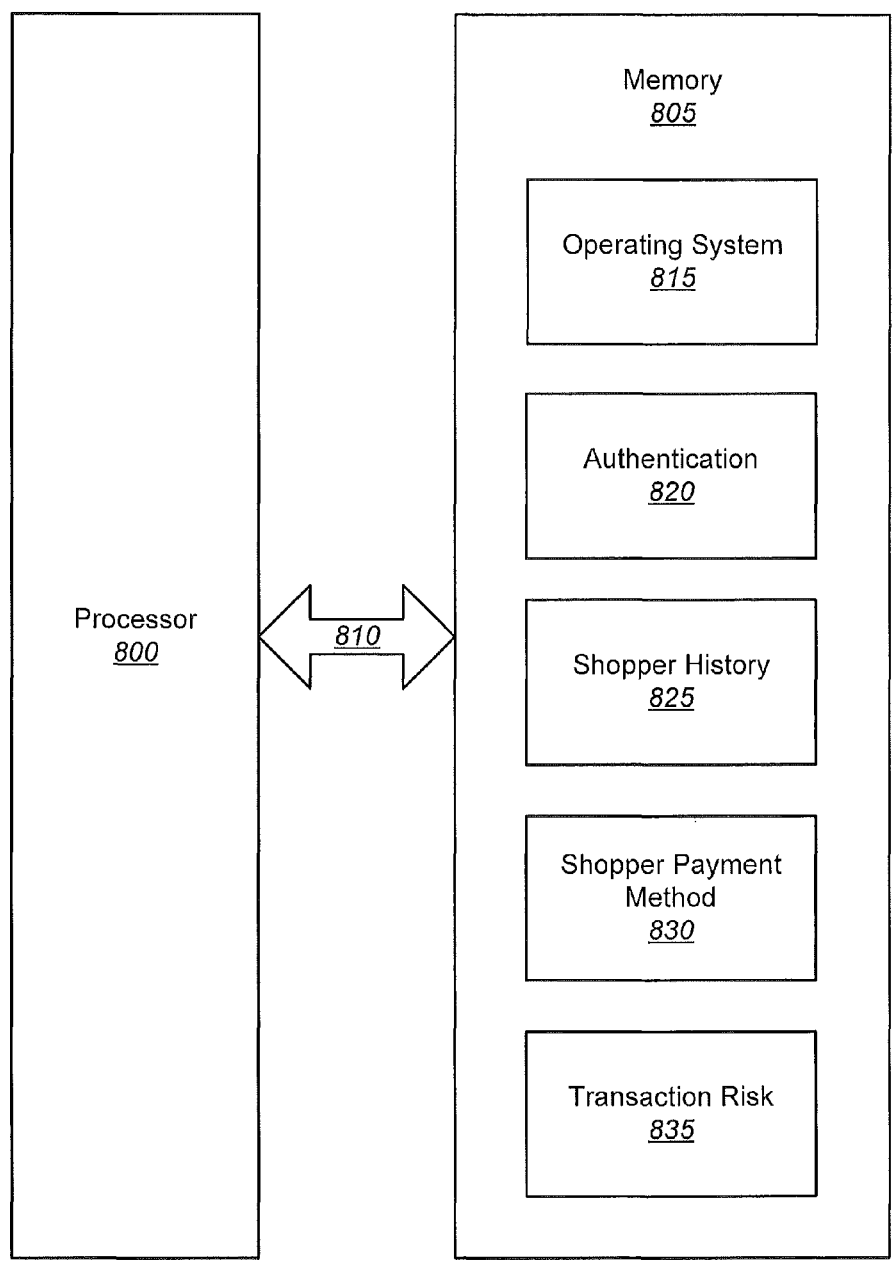
FIG. 8 is a block diagram that illustrates a software/hardware architecture for a payments systems server in accordance with some embodiments of the inventive subject matter.

FIG. 8 illustrates a processor 800 and memory 805 that may be used in embodiments of data processing systems, such as the data processing system 700 of FIG. 5, for providing payment services in accordance with some embodiments of the inventive subject matter. The processor 800 communicates with the memory 805 via an address/data bus 810. The processor 800 may be, for example, a commercially available or custom microprocessor. The memory 805 is representative of the one or more memory devices containing the software and data used to provision software in accordance with some embodiments of the present invention. The memory 805 may include, but is not limited to, the following types of devices: cache, ROM, PROM, EPROM, EEPROM, flash, SRAM, and DRAM.

As shown in FIG. 8, the memory 805 may contain up to five or more categories of software and/or data: an operating system 815, an authentication module 820, a shopper history module 825, a shopper payment method module 830, and a transaction risk module 835. In particular, the operating system 815 may manage the data processing system's software and/or hardware resources and may coordinate execution of programs by the processor 800.

The authentication module 820 may be configured to process credentials provided by a shopper, for example, to authenticate the shopper's identity when making a purchase. In some embodiments, the credentials may include, but are not limited to, a user identification (e.g., driver's license number, passport number, social security number), a phone number, an employee number, email address, home address, and a loyalty program account number. The credentials may, in further embodiments, include location information, such as GPS coordinate data and/or location data based on triangulation techniques through a wireless or cellular network, for example.

The shopper history module 825 may be configured to access a shopper's history with a particular retailer/merchandiser or across multiple retailers/merchandisers to determine attributes that may be indicative of risk, such as, but not limited to, amount typically purchased, whether shopper provided a home address, whether the shopper has participated in particular loyalty programs, whether the shopper returns items at a frequency higher than a typical shopper, whether the shopper frequently expresses displeasure through surveys, message boards, forums, and the like, whether the shopper make purchases at atypical times, e.g., late at night, and whether the shopper make purchases in a variety of geographic areas. The shopper history module 825 may generate an indication that the shopper is a known shopper based on the shopper's purchase activity and behavior, which can be used to extend to the shopper a virtual card present status by a financial institution when payment is being made through a credit card or other type of bank card. The shopper history module 825 may also be configured to generate and maintain a net score that is representative of the financial risk that a particular shopper poses for a retailer, manufacturer, and/or financial institution that may be advancing funds for a purchase. As the shopper purchases in positive patterns, the net score may be updated to reflect a lower financial risk whereas when the shopper purchases in negative patterns, the net score may be updated to reflect a higher financial risk.

The shopper payment method module 830 may be configured to associate credentials provided by a shopper with payment methods. In particular, a shopper's credentials may be associated with a shopper's mobile device. The credentials may include, but are not limited to, a user identification (e.g., driver's license number, passport number, social security number), a phone number, an employee number, email address, home address, and a loyalty program account number. For example, a shopper when registering with a loyalty program, for example, may associate a mobile device phone number with a loyalty program account number. At the time purchase, the shopper may be authenticated by using a mobile carrier's user authentication technology. Mobile payment processors may tie a shopper's identity to a mobile device based on the mobile device's SIM card, device identification, and location. A shopper may initiate payment through a mobile payment application resident on the mobile device, which uses a wireless network, such as a cellular network and Signaling System 7 (SS7) network, to request payment through a mobile payment processor. The user may have multiple payment options available through the mobile payment processor including adding the charge to the shopper's wireless bill issued by the shopper's mobile carrier, a credit card account, debit card account, checking account, or the like. To make a fraudulent purchase, a thief would need more than a shopper's phone number, but would need the shopper's actual mobile device to initiate a payment.

The transaction risk module 835 may be configured to cooperate with the shopper history module 825 to generate and maintain a net score that is representative of the financial risk that a particular shopper poses for a retailer, manufacturer, and/or financial institution that may be advancing funds for a purchase as described above. In some embodiments, the transaction risk module may analyze the contents of a shopper's basket to determine if the products or services being purchased tend to increase the financial risk for a retailer, manufacturer, and/or financial institution. For example, in some embodiments, the contents of a shopper's basket may be compared to historical purchases to determine if a current purchase is atypical, which may be indicative that the shopper is using a stolen credit card for example. Items such as multiple pre-paid debit/gift cards, alcohol, tobacco, and multiple instances of the same electronic device are some examples of items that may heighten the risk for retailers, manufacturers, and/or financial institutions. Based on an evaluation of the items/services being purchased by a shopper, the transaction risk module 835 may report an alert to the retailer, manufacturer, and/or financial institution that approval of the present transaction may have a higher than normal financial risk associated therewith.

Although FIG. 8 illustrates exemplary hardware/software architectures that may be used in data processing systems, such as the data processing system 700 of FIG. 7, for providing payment services, it will be understood that the present invention is not limited to such a configuration but is intended to encompass any configuration capable of carrying out operations described herein. Moreover, the functionality of the data processing system 700 of FIG. 7 and the hardware/software architecture of FIG. 8 may be implemented as a single processor system, a multi-processor system, a multi-core processor system, a network of stand-alone computer systems, or one or more virtual machines in accordance with various embodiments.

Computer program code for carrying out operations of data processing systems discussed above with respect to FIG. 8 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

Figure 9:
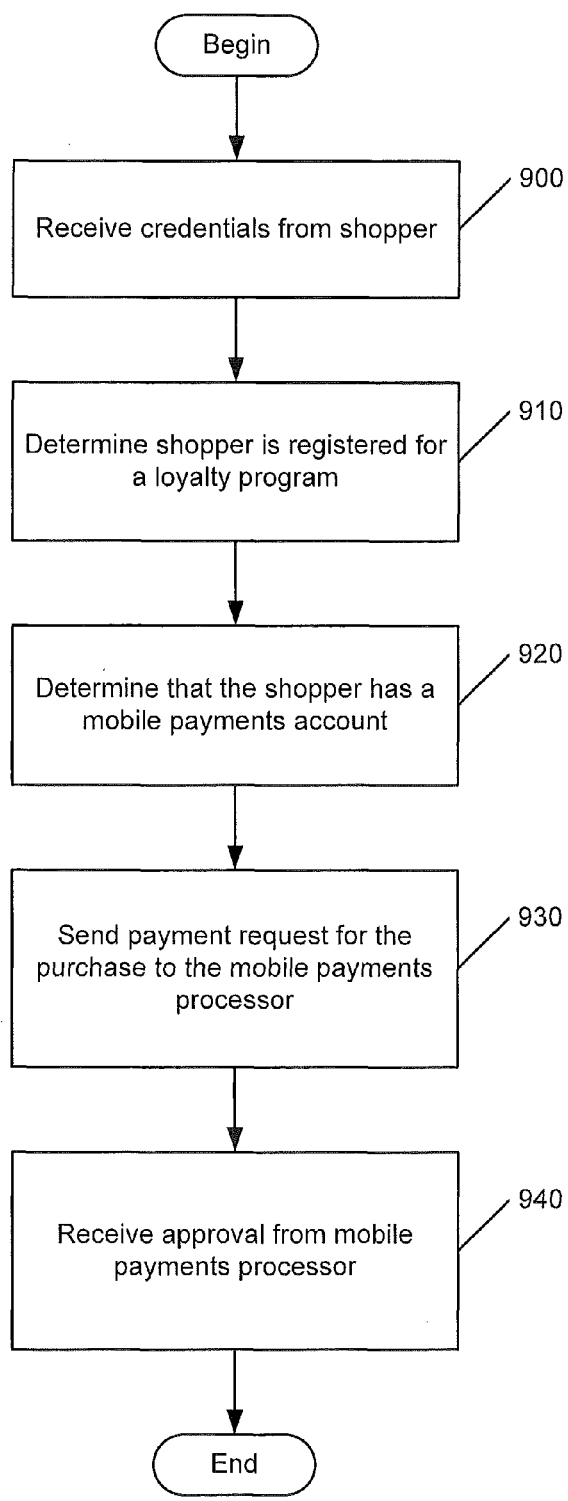
FIGS. 9-10 are flowcharts that illustrate operations for associating a shopper loyalty program with a mobile payments account according to some embodiments of the inventive subject matter.
Figure 10:
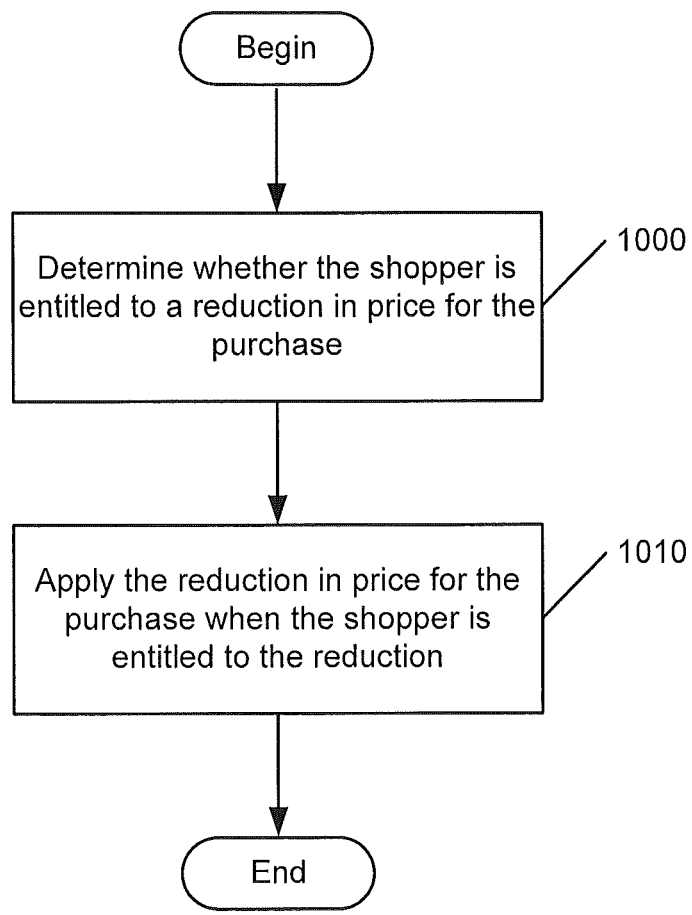

FIGS. 9-10 are flowcharts that illustrate operations for associating a shopper loyalty program with a mobile payments account according to some embodiments of the inventive subject matter. Operations begin at block 900 where the DPN 420 receives credentials from a shopper through the POS system 410, for example. As described above, the credentials may include, but are not limited to, one or more of a user identification, home and/or mobile phone number, employee number, email address, home address, and loyalty program account number. The credentials may be communicated, for example, through an application on a shopper's mobile device 415 through scanning, Near Field Communication (NFC) technology, short range wireless technology, such as Bluetooth technology, or other suitable manner. The credentials may also be communicated by a card including a bar code that can be scanned at the POS system 410 or manually entered in to the POS system 410 by the shopper or checkout attendant. In some embodiments, the credentials may further include an identification of the POS system 410 terminal through which the purchase is initiated at a merchant, for example.

Based on the credentials provided by the shopper, the DPN 420 may determine that the shopper is registered for a loyalty program with the merchant at block 910 and that the shopper has a mobile payments account with this merchant at block 920. For example, a shopper may when signing up for a loyalty program with a merchant indicate that the shopper has a mobile payments account, such as a Payfone account. In some embodiments, the shopper may also communicate with the DPN 420 to associate a mobile payments account with all or selective loyalty programs corresponding to various merchants.

At block 930, the payments system 425 may send a payment request for a purchase from the shopper to the mobile payments processor. The shopper has previously initiated payment for the purchase using, for example, an application on the mobile device 415 to communicate the payment authorization request to the mobile payments processor via a wireless connection, for example. The payments system 425 may use the mobile phone number of the shopper to identify the shopper to allow the mobile payments processor to match the payment request from the payments system 425 with the payment authorization request from the shopper. The payment system 425 receives at block 940 an approval for the purchase, which may then be communicated to the merchant. The payment system 425 may send a transaction identification for the purchase to the mobile payments processor. The merchant need not know the particulars of what payment method the shopper is using to ensure payment as the mobile payments processor acts as a proxy for payment and uses whatever method the shopper has set up with the mobile payment processor, e.g., credit card, debit card, checking account, monthly wireless service account, etc.

Referring now to FIG. 10, the DPN 420 may determine at block 1000 that the shopper is registered for a loyalty program with the merchant based on the shopper's credentials. Based on the content of the shopper's basket (i.e., collection of products and/or services the shopper is purchasing), the DPN 420 may determine at block 1010 whether the shopper is entitled to a reduction in price for the purchase by determining if the shopper has acquired any available promotions and/or offers that are applicable to the content in the shopper's basket. The shopper may be presented with the option of redeeming any applicable promotions and/or offers and the POS system 410 may apply the reduction in price to the purchase at block 1030. The POS system 410 may also communicate with the DPN 420 to update the shopper's account to reflect the redemption of any promotions and/or offers and to add any promotions and/or offers that may have been earned based on the shopper's purchase transaction.

The flowcharts and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art That which is claimed:

1. A system for processing a shopper loyalty program with a mobile payments account, the system comprising:
a communications network;
a mobile payments processing system coupled to said communications network;
a point-of-sale (POS) device coupled to said communications network and configured to process products for purchase during a purchase transaction;
a digital promotions server coupled to said communications network;
a payment system coupled to said communications network; and
a mobile wireless communications device associated with a user and configured to
communicate at least one user identification to said digital promotions server via said POS device without communicating payment information thereto, and
wirelessly communicate a first payment authorization request to said mobile payments processing system for a purchase associated with the user;
said digital promotions server configured to
determine whether the user is registered for the shopper loyalty program based upon the at least one user identification,
determine whether the user is registered for a mobile payments account based upon whether the user is registered for the shopper loyalty program, and
communicate the at least one user identification to the said payment system;
said payment system configured to communicate a second payment authorization request to said mobile payments processing system based upon the at least one user identification;
said mobile payments processing system configured to
approve payment for the purchase transaction based upon the first and second payment authorization requests, and
communicate the approval of the payment to said POS device.

2. The system of claim 1 wherein the at least one user identification comprises a unique identification associated with said mobile wireless communications device.

3. The system of claim 1 wherein the at least one user identification comprises a phone number associated with said mobile wireless communications device.

4. The system of claim 1 wherein the first payment authorization request comprises the at least one user identification; and wherein said mobile payments processing system is configured to approve payment for the purchase transaction based upon a match of the at least one user identification communicated with the first and second payment authorization requests.

5. The system of claim 1 wherein said mobile payments processing system is configured to communicate the approval via said payment system.

6. The system of claim 1 wherein said digital promotions server is configured to determine whether the user is entitled to a discount when the user is registered for the shopper loyalty program and based upon the products for purchase during the purchase transaction.

7. The system of claim 6 wherein said digital promotions server is configured to communicate with said POS device for applying the discount to the purchase transaction.

8. The system of claim 1 wherein said mobile wireless communications device and said POS device each comprises short-range wireless communications circuitry; and wherein said mobile wireless communications device is configured to wirelessly communicate the at least one user identification to said POS device via said short-range wireless communications circuitry.

9. A method of processing a shopper loyalty program with a mobile payments account, the method comprising:
using a mobile wireless communications device associated with a user to
communicate at least one user identification to a digital promotions server coupled to a POS device via a communications network without communicating payment information thereto, the POS device configured to process products for purchase during a purchase transaction, and
wirelessly communicate a first payment authorization request to a mobile payments processing system coupled to the communications network for a purchase associated with the user; and
using the digital promotions server to
determine whether the user is registered for the shopper loyalty program based upon the at least one user identification,
determine whether the user is registered for a mobile payments account based upon whether the user is registered for the shopper loyalty program, and
communicate the at least one user identification to the a payment system coupled to the communications network, the payment system communicating a second payment authorization request to the mobile payments processing system based upon the at least one user identification, and the mobile payments processing system approving payment for the purchase transaction based upon the first and second payment authorization requests and communicating the approval of the payment to the POS device.

10. The method of claim 9 wherein the at least one user identification comprises a unique identification associated with the mobile wireless communications device.

11. The method of claim 9 wherein the at least one user identification comprises a phone number associated with the mobile wireless communications device.

12. The method of claim 9 wherein the first payment authorization request comprises the at least one user identification; and wherein the mobile payments processing system is configured to approve payment for the purchase transaction based upon a match of the at least one user identification communicated with the first and second payment authorization requests.

13. The method of claim 9 wherein the digital promotions server is used to determine whether the user is entitled to a discount when the user is registered for the shopper loyalty program and based upon the products for purchase during the purchase transaction.

14. The method of claim 13 wherein the digital promotions server is used to communicate with the POS device for applying the discount to the purchase transaction.

15. The method of claim 9 wherein the mobile wireless communications device and the POS device each comprises short-range wireless communications circuitry; and wherein the mobile wireless communications device is used to wirelessly communicate the at least one user identification to the POS device via the short-range wireless communications circuitry.

16. A non-transitory computer readable medium having computer executable instructions for causing at least one processor of a digital promotions server to perform operations comprising:

determining whether a user is registered for a shopper loyalty program based upon at least one user identification wirelessly communicated from a mobile wireless communications device associated with the user via a POS device coupled to the digital promotions server via a communications network, the at least one user identification being wirelessly communicated without communicating payment information thereto, the POS device configured to process products for purchase during a purchase transaction, the mobile wireless communications device wirelessly communicating a first payment authorization request to a mobile payments processing system coupled to the communications network for a purchase associated with the user;

determining whether the user is registered for a mobile payments account based upon whether the user is registered for a shopper loyalty program; and communicate the at least one user identification to the a payment system coupled to the communications network, the payment system communicating a second payment authorization request to the mobile payments processing system based upon the at least one user identification to cause the mobile payments processing system to approve payment for the purchase transaction based upon the first and second payment authorization requests and communicate the approval of the payment to the POS device.

17. The non-transitory computer readable medium of claim 16 wherein the at least one user identification comprises a unique identification associated with the mobile wireless communications device.

18. The non-transitory computer readable medium of claim 16 wherein the at least one user identification comprises a phone number associated with the mobile wireless communications device.

19. The non-transitory computer readable medium of claim 16 wherein the computer executable instructions cause the at least one processor to perform the operations comprising determining whether the user is entitled to a discount when the user is registered for the shopper loyalty program and based upon the products for purchase during the purchase transaction.

20. The non-transitory computer readable medium of claim 19 wherein the computer executable instructions cause the at least one processor to perform the operations comprising communicating with the POS device for applying the discount to the purchase transaction.

\* \* \* \* \*